US005970709A

United States Patent [19]

Tohji

[11] Patent Number: 5,970,709

[45] **Date of Patent: *Oct. 26, 1999**

[54] HYDRAULIC CONTROL CIRCUIT IN A HYDRAULIC EXCAVATOR

[75] Inventor: Yutaka Tohji, Hiroshima, Japan

[73] Assignee: Kabushiki Kaisha Kobe Seiko Sho, Kobe, Japan

[ * ] Notice: This patent is subject to a terminal disclaimer.

[21] Appl. No.: 08/941,031

[22] Filed: Sep. 30, 1997

[30] Foreign Application Priority Data

Sep. 30, 1996 [JP] Japan .................................... 8-280281

[51] Int. Cl.$^6$ .................................................... F16D 31/02

[52] U.S. Cl. ................................................ 60/421; 60/429

[58] Field of Search ............................ 60/421, 428, 429; 91/444

[56] References Cited

U.S. PATENT DOCUMENTS

| | | | |
|---|---|---|---|
| 3,270,059 | 8/1966 | Schurawski et al. | 60/421 |
| 3,922,855 | 12/1975 | Bridwell et al. | 60/421 |
| 5,046,309 | 9/1991 | Yoshino | 60/452 |
| 5,083,428 | 1/1992 | Kubomoto et al. | 60/422 |
| 5,277,027 | 1/1994 | Aoyagi et al. | 60/452 |

FOREIGN PATENT DOCUMENTS

| | | |
|---|---|---|
| 6-240709 | 8/1994 | Japan . |
| 7-207697 | 8/1995 | Japan . |

*Primary Examiner*—F. Daniel Lopez
*Attorney, Agent, or Firm*—Oblon, Spivak, McClelland, Maier & Neustadt, P.C.

[57] ABSTRACT

Pilot change-over valves for operating actuators are connected in a center bypassing form and a cut-off valve is disposed downstream of each such pilot change-over valves. Commands which are in a proportional relation to each other are outputted from a controller to a pilot port of the cut-off valve and a pilot port of a pilot change-over valve for boom. Both valves are closed synchronously. Operation commands for both valves can be altered with a volume control for setting operation characteristics. Hydraulic pump oils for arm are joined together by a confluent valve. Consequently, highly responsive operations can be attained in operating the attachment of a hydraulic excavator. This is effective in the ground hardening work with a bucket, the work for removing mud from the machine body and the work for scattering soil.

11 Claims, 4 Drawing Sheets

HYDRAULIC CONTROL CIRCUIT IN A HYDRAULIC EXCAVATOR

BACKGROUND OF THE INVENTION

1. Field of the Invention

The present invention relates to a hydraulic control circuit in a hydraulic excavator. More particularly, the invention is concerned with a system for changing over the responsivity of an attachment attached to the front portion of a hydraulic excavator.

2. Description of the Prior Art

FIG. 6 is a hydraulic circuit diagram described as FIG. 1 in Japanese Patent Laid Open No. 207697/95. A hydraulic excavator shown in FIG. 6 is equipped at the front portion thereof with a working attachment 1 comprising a boom 2, an arm 3 and a bucket 25. When time t0 required for actually depressing a lever is shorter than time T which has been preset for the lever depressing operation (time set by a lever depression time setting device 30), if a lever 15 of a remote control valve 12 for boom is operated, a pilot pressure acts shorter than the preset time T on a boom lowering pilot port 22 of a pilot change-over valve 8 for boom. The pilot pressure is detected by a pressure sensor 28 and the detected pressure signal is fed to a controller 29. On the basis of this pressure signal the controller 29 judges that the actual lever depressing time t0 is shorter than the preset time T, and does not output a throttled oil path position change-over command signal to an electromagnetic change-over valve 26. Since a solenoid 27 is deenergized and the electromagnetic change-over valve 26 is in an open oil path position "$\alpha$", it is possible to perform operation in high responsivity. That is, it is possible to conduct a bucket striking work which requires a quick operation.

In the prior art shown in FIG. 6, however, when a work involving a quick operation which requires a high operation responsivity (for example, a ground hardening work with the back of a bucket, a soil scattering work, or a mud removing work from the machine body) is to be performed, it is necessary that a repeated change-over operation be done for the lever 15 of the remote control valve 12 for boom in a shorter time than the preset time T. This limitation imposed on the operation time has been inconvenient in executing operations.

In the prior art shown in FIG. 6, moreover, no means have been taken for effecting slow works which require a low operation responsivity (for example, a slope face correcting work, a leveling work, and a load lifting work).

SUMMARY OF THE INVENTION

It is an object of the present invention to provide a hydraulic control circuit in a hydraulic excavator capable of effecting selectively a quick work requiring a high responsivity and a slow work requiring a low responsivity.

The hydraulic excavator control circuit of the present invention is provided with a cylinder for operating a boom, a pilot change-over valve for the boom which valve controls the operation of the boom cylinder, a center bypassing oil path extending through a neutral position of the pilot change-over valve for the boom and providing communication between a hydraulic pump and a hydraulic oil tank, and a cut-off valve disposed downstream of the pilot change-over valve for the boom in the center bypassing oil path. In order to enhance the responsivity of the boom cylinder, the hydraulic circuit of the invention is further provided with a control means which causes the cut-off valve and the pilot change-over valve for the boom to be closed in a proportional relation to each other.

The present invention is applicable not only to the hydraulic circuit for a boom but also to a hydraulic circuit for an arm.

According to the present invention, when a quick work requiring a high responsivity is to be performed, the cut-off valve and the pilot change-over valve are closed in a proportional relation to each other, so it is possible to improve the responsivity of the cylinder for boom or arm, whereby, for example, the ground hardening work with the back of a bucket, the mud removing work from the bucket, or the soil scattering work, can be done in high responsivity by the hydraulic excavator to which the invention is applied.

Preferably, an operation characteristic selecting means, say, a volume control or a switch, capable of adjusting the output of the control means is connected to the control means. This is convenient because the operation responsivity of the boom or arm can be adjusted freely.

Preferably, the step-up gain of the regulator of the hydraulic pump is increased to enhance the responsivity of the boom or arm cylinder. Preferably, there are provided two hydraulic pumps for the arm cylinder and the boom cylinder, respectively, and the oils from the two hydraulic pumps are joined together. In these cases, the amount of oil fed to the boom or arm cylinder can be increased and hence it is possible to improve the operation responsivity of the boom or arm, rapidly at the initial stage of operation of the boom or arm. In this case, it is possible to improve the responsivity at the time of start-up of operation of the boom or arm.

DESCRIPTION OF THE PREFERRED EMBODIMENTS

Embodiments of the present invention will be described in detail hereinunder with reference to the accompanying drawings.

Figure 1:
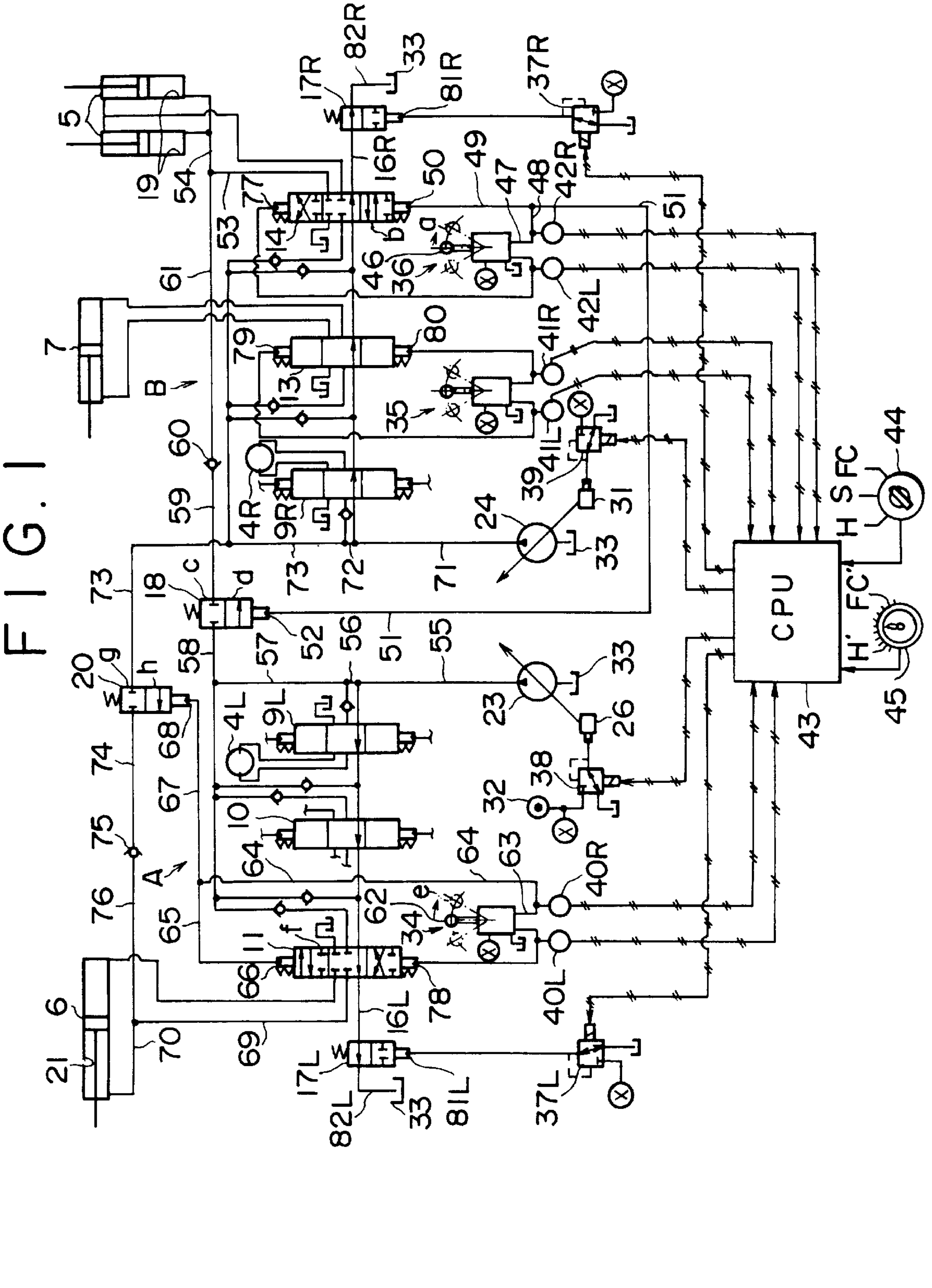
FIG. 1 is a circuit diagram showing a hydraulic control circuit in a hydraulic excavator according to an embodiment of the present invention.
Figure 6:
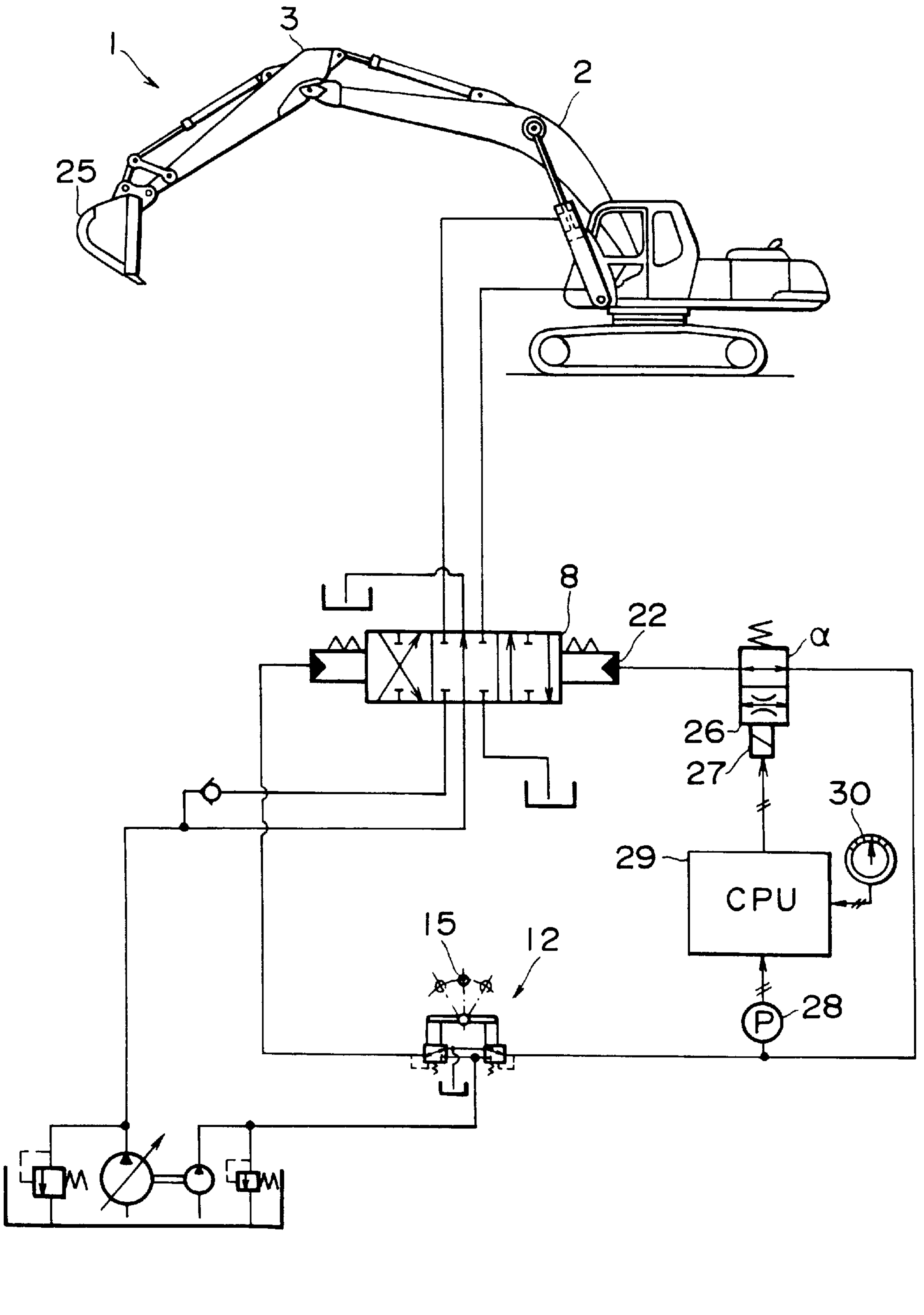
FIG. 6 PRIOR ART
FIG. 6 is a conventional hydraulic circuit diagram.

FIG. 1 is a circuit diagram showing a hydraulic control circuit in a hydraulic excavator according to an embodiment of the present invention. In the same figure, the reference numerals 4L and 4R denote a pair of left and right traveling motors mounted on a lower carriage of the hydraulic excavator. Numeral 5 denotes a boom cylinder for driving a boom attached to an upper rotating structure of the hydraulic excavator. Numeral 6 denotes an arm cylinder for driving an arm. Numeral 7 denotes a bucket cylinder for driving a bucket. The boom, arm and bucket driven by the cylinders 5, 6 and 7, respectively, are the same as those shown in FIG. 6. Numerals 9L and 9R denote left and right traveling direction change-over valves for controlling the left and light traveling motors 4L and 4R, respectively. Numeral 10 denotes a direction change-over valve controlling another hydraulic actuator (not shown). Numeral 11 denotes a pilot change-over valve for arm which valve controls the arm cylinder 6. Numeral 13 denotes a pilot change-over valve for bucket which valve controls the bucket cylinder 7. Numeral 14 denotes a pilot change-over valve for boom which valve controls the boom cylinder 5. Numerals 16L and 16R denote left and right center bypassing oil paths, respectively. Numerals 17L and 17R denote first and second cut-off valves, respectively, disposed in downstream outlets of the left and right center bypassing oil paths 16L and 16R. Numeral 18 denotes a confluent valve for boom which valve joins pressure oils and supplies the joined oil to a bottom-side oil chamber 19, the oil chamber 19 being a boom raising-side oil chamber in the boom cylinder 5. Numeral 20 denotes a confluent valve for arm which valve joins pressure oils and supplies the joined pressure oil to a rod-side oil chamber 21, the oil chamber 21 being an arm pushing-side oil chamber in the arm cylinder 6. Numeral 23 denotes a second pump which is a hydraulic pump for discharging pressure oil to a circuit for arm. Numeral 24 denotes a first pump which is a hydraulic pump for discharging pressure oil to a circuit for boom. Numerals 26 and 31 denote regulators for the second and first pumps 23, 24, respectively. Numeral 32 denotes a pilot oil pressure source such as a pilot pump for example. Numeral 33 denotes a hydraulic oil tank. Numerals 34, 35 and 36 denote hydraulic remote control valves for arm, bucket and boom, respectively. Numerals 37L, 37R, 38 and 39 denote electromagnetic proportional pressure reducing valves. Numerals 40L and 40R denote pressure sensors for detecting the operation of the pilot change-over valve 11 for arm. Numerals 41L and 41R denote pressure sensors for detecting the operation of the pilot change-over valve 13 for bucket. Numerals 42L and 42R denote pressure sensors for detecting the operation of the pilot change-over valve 14 for boom. Numeral 43 denotes a controller. Numeral 44 denotes a work mode change-over switch. Numeral 45 denotes a volume control. The mark X—X represents a pilot line extending from the pilot oil pressure source 32.

When the work mode change-over switch 44 is turned to an H mode position, the engine speed is set to a maximum rotating speed (rated rotating speed). When the switch 44 is turned to an S mode position, the engine speed is set to a standard, medium rotating speed. Further, when the switch 44 is turned to an FC mode position, the engine speed is set to a low rotating speed.

When an operating lever 46 of the hydraulic remote control valve 36 for boom is turned toward position "a" from a neutral position, a pilot pressure derived from the valve 36 acts on a pilot port 50 of the pilot change-over valve 14 for boom through lines 47,48 and 49. At the same time, part of the pilot pressure branches from the line 48 and acts on a pilot port 52 of the confluent valve 18 for boom through a line 51. As a result, the pilot change-over valve 14 for boom shifts from a neutral position to position "b" and the confluent valve 18 for boom shifts from an oil path shut-off position "c" to an oil path open position "d". Pressure oil from the first pump 24 passes the position "b" in the pilot change-over valve 14 for boom, then passes through lines 53 and 54 and is fed to the bottom-side oil chamber 19 in the boom cylinder 5, while pressure oil from the second pump 23 flows through lines 55, 56, 57, 58, then through position "d" in the confluent valve 18 for boom, further through line 59, check valve 60 and line 61, and joins the pressure oil flowing through line 54. Therefore, when a boom raising operation is performed, a joined stream of the pressure oils from the second and first pumps 23, 24 is fed to the bottom-side oil chamber 19 in the boom cylinder 5.

When an operating lever 62 of the hydraulic remote control valve 34 for arm is turned toward position "e" from a neutral position, a pilot pressure derived from the hydraulic remote control valve 34 for arm acts on a pilot port 66 of the pilot change-over valve 11 for arm through lines 63, 64 and 65. At the same time, part of the pilot pressure branches from line 64 and acts on a pilot port 68 of the confluent valve 20 for arm through line 67. As a result, the pilot change-over valve 11 for arm shifts from a neutral position to position "f" and the confluent valve 20 for arm shifts from an oil path shut-off position "g" to an oil path open position "h". Consequently, the pressure oil from the second pump 23 flows through position "f" in the pilot change-over valve 11 for arm, then through lines 69 and 70, and is fed to the rod-side oil chamber 21 in the arm cylinder 6. On the other hand, the pressure oil from the first pump 24 flows through lines 71, 72, 73, then through position "h" in the confluent valve 20 for arm, further through line 74, check valve 75 and line 76, and joins the pressure oil flowing through line 70. Therefore, when the operation for pushing out the arm is performed, a joined stream of the pressure oils from the second and first pumps 23, 24 is fed to the rod-side oil chamber 21 in the arm cylinder 6. The cut-off valves 17L and 17R disposed downstream of the center bypassing oil paths 16L and 16R, respectively, are for closing downstream outlets of the oil paths 16L and 16R at the time of confluence of pressure oils upon push-out of the arm or rise of the boom.

The construction of this embodiment will now be described with reference to FIG. 1. In this embodiment, a plurality of actuator controlling direction change-over valves (pilot change-over valves) mounted in the hydraulic excavator are classified into two groups (group A and group B) and the pressure oils from the separate first and second pumps 24, 23 are fed to both groups A and B. The group A comprises the traveling direction change-over valve 9L, direction change-over valve 10 and pilot change-over valve 11 for arm, while the group B comprises the traveling direction change-over valve 9R, pilot change-over 13 for bucket and pilot change-over valve 14 for boom. The left and right traveling direction change-over valves 9L and 9R are disposed at the upmost stream sides of the groups A and B, respectively, and downstream thereof are arranged in parallel other pilot change-over valves. The cut-off valves 17L and 17R are disposed in downstream outlets of the center bypassing oil paths 16L and 16R, respectively. Through the oil paths 16L, 16R and through neutral positions of the plural pilot change-over valves in the groups A and B the pressure oils from the first and second pumps 24, 23 flow respectively into hydraulic tanks 33. Further provided are pressure sensors 42L and 42R for detecting pilot pressures acting on pilot ports 77 and 50 formed on both end sides of the pilot change-over valve 14 for boom, pressure sensors 40L and 40R for detecting pilot pressures acting on pilot ports 78 and 66 formed on both end sides of the pilot change-over valve 11 for arm, and pressure sensors 41L and 41R for detecting pilot pressures acting on pilot ports 79 and 80 formed on both end sides of the pilot change-over 3 for bucket. Signals provided from the pressure sensors 42L, 42R, 40L, 40R, 41L and 41R are fed to the controller 43. In accordance with the signals thus fed the controller 43 outputs cut-off valve control signals proportional to the signals through the electromagnetic proportional pressure reducing valves 37L and 37R. Connected to the controller 43 is an adjustable volume control 45 as an operation characteristic selecting means for selecting operation characteristics of the actuators (boom, arm, and bucket). A current value of command signals for controlling the cut-off valves can be adjusted by the volume control 45. Further, as the operation characteristic selecting means a work mode change-over switch 44 capable of selecting plural modes (plural stages of H mode, S mode and FC mode) is connected to the controller 43. A current value of command signals for controlling the cut-off valves can be adjusted by the work mode change-over switch 44. In accordance with the signals provided from the pressure sensors 42L, 42R, 40L, 40R, 41L, 41R and in reply to the operations of the direction change-over valves 14, 11 and 13 for controlling the actuators the controller 43 outputs command signals to the regulator 31 for the first pump 24 and the regulator 26 for the second pump 23.

Figure 2:
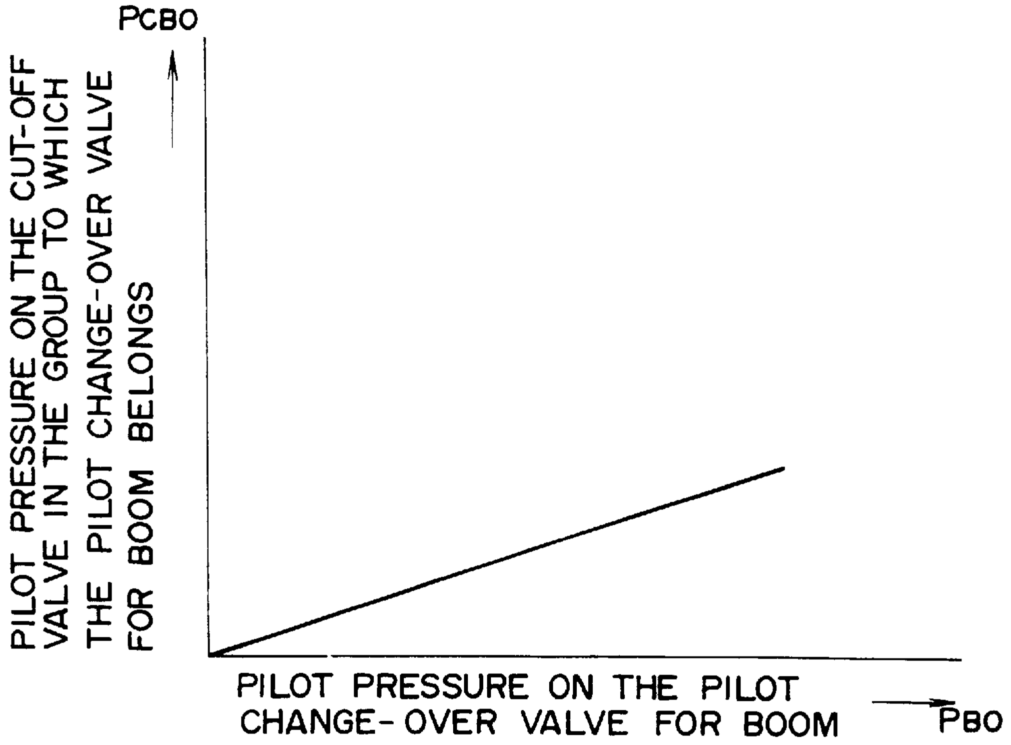
FIG. 2 is a graph showing a relation between a pilot pressure on a pilot change-over valve for boom and a pilot pressure on a cut-off valve in a group to which the pilot change-over valve for boom belongs.
Figure 3:
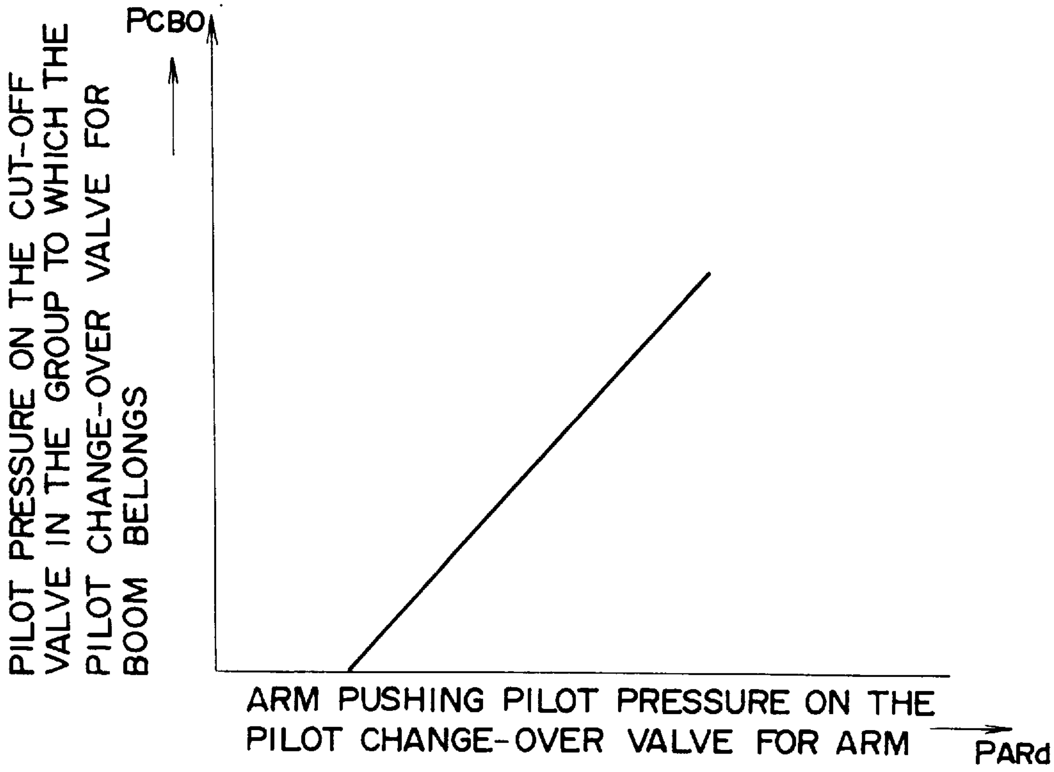
FIG. 3 is a graph showing a relation between an arm pushing pilot pressure on a pilot change-over valve for arm and the pilot pressure on the cut-off valve in the group to which the pilot change-over valve for boom belongs.
Figure 4:
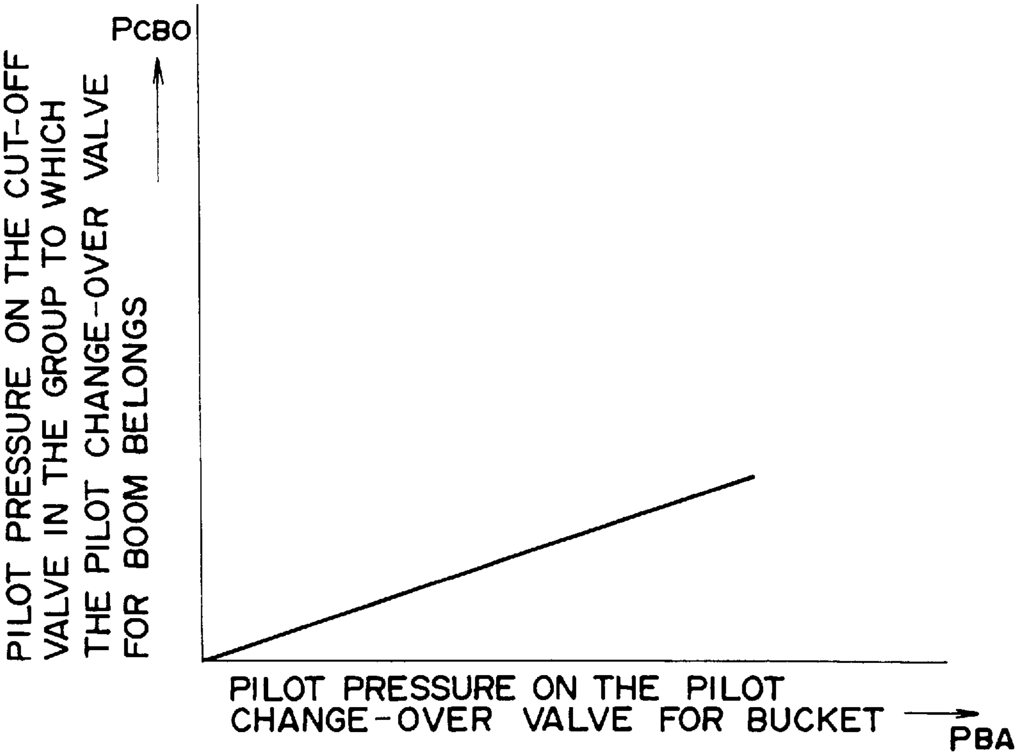
FIG. 4 is a graph showing a relation between a pilot pressure on a pilot change-over valve for bucket and the pilot pressure on the cut-off valve in the group to which the pilot change-over valve for boom belongs.

The operation of this embodiment will now be described. FIG. 2 is a graph showing a relation between a pilot pressure $P_{BO}$ acting on the pilot port 50 of the pilot change-over valve 14 for boom and a pilot pressure $P_{CBO}$ acting on the first cut-off valve 17R in group B to which the pilot change-over valve 14 for boom belongs. FIG. 3 is a graph showing a relation between an arm pushing pilot pressure $P_{ARd}$ acting on the pilot port 66 of the pilot change-over valve 11 for arm and the pilot pressure $P_{CBO}$. FIG. 4 is a graph showing a relation between a pilot pressure $P_{BA}$ acting on the pilot port 79 or 80 of the pilot change-over valve 13 for bucket and the pilot pressure $P_{CBO}$. As shown in FIGS. 2, 3 and 4, the pilot pressure for command acting on the first cut-off valve 17R is outputted from the controller 43 in proportion to the pilot pressure acting on the pilot port of each pilot change-over valve. The second cut-off valve 17L is also controlled in the same manner as above.

It is here assumed that the boom raising operation has been performed. The bleed-off of a main spool (not shown) of the pilot change-over valve 14 for boom is set to a characteristic for a precise operability and is therefore unsuitable for a work which requires a high responsivity. Where a high responsivity is needed in this embodiment, the first cut-off valve 17R located downstream of the main spool of the pilot change-over valve 14 for boom is closed simultaneously with closing of the main spool. To be more specific, the first cut-off valve 17R is closed gradually in proportion to the pilot pressure for boom acting on the pilot port 50 of the pilot change-over valve 14. Consequently, a combined total of both bleed-off open areas affords a rather closed state than the normal state, whereby the responsivity to the operation of the associated lever is improved. In other words, by opening or closing the first cut-off valve 17R as shown in FIG. 2 in proportion to the boom raising operation (the aforesaid pilot pressure for boom corresponding to a spool change-over signal), the responsivity is improved by virtue of a double throttling effect.

If the boom lowering operation is controlled in the same way as in the boom raising operation, it will be effective in performing the ground hardening work with the back of the bucket. Also in performing the work for removing mud from the bucket or the soil scattering work, if the main spool of the first cut-off valve 17R located downstream of the pilot change-over valve 13 of bucket is controlled in accordance with the pilot pressure for bucket, the responsivity will be improved. This is also the case with the work for removing mud from the arm.

In accordance with the signals provided from the pressure sensors 42L, 42R, 40L, 40R, 41L and 41R the controller 43 outputs command signals to the regulator 26 for the second pump 23 and the regulator 31 for the first pump 24. Therefore, by change-over of the cut-off valves 17R and 17L in proportion to the boom raising or lowering operation, bucket releasing or excavating operation, and arm pushing or pulling operation, it becomes possible to increase the step-up gain for the second and first pumps 23, 24 and thereby improve the responsivity of the boom cylinder 5, bucket cylinder 7 and arm cylinder 6. The change-over of such gain can also be effected by suitably setting the volume control 45 or the work mode change-over switch 44.

The control for the cut-off valves 17L and 17R in joining boom or arm actuating oil pressures and the control for the cut-off valves in operating the boom and bucket can be made compatible with each other on a high-level selection basis (by adopting a higher cut-off valve command pilot pressure). In a negative control system (not shown) wherein the flow rates of oils flowing through the center bypassing oil paths 16L and 16R are detected to control the first and second pumps 24, 23, the oil paths 16L and 16R are throttled, so that not only the pump step-up gain but also the pump flow increasing gain is improved and hence the expected effect is more enhanced.

Figure 5:
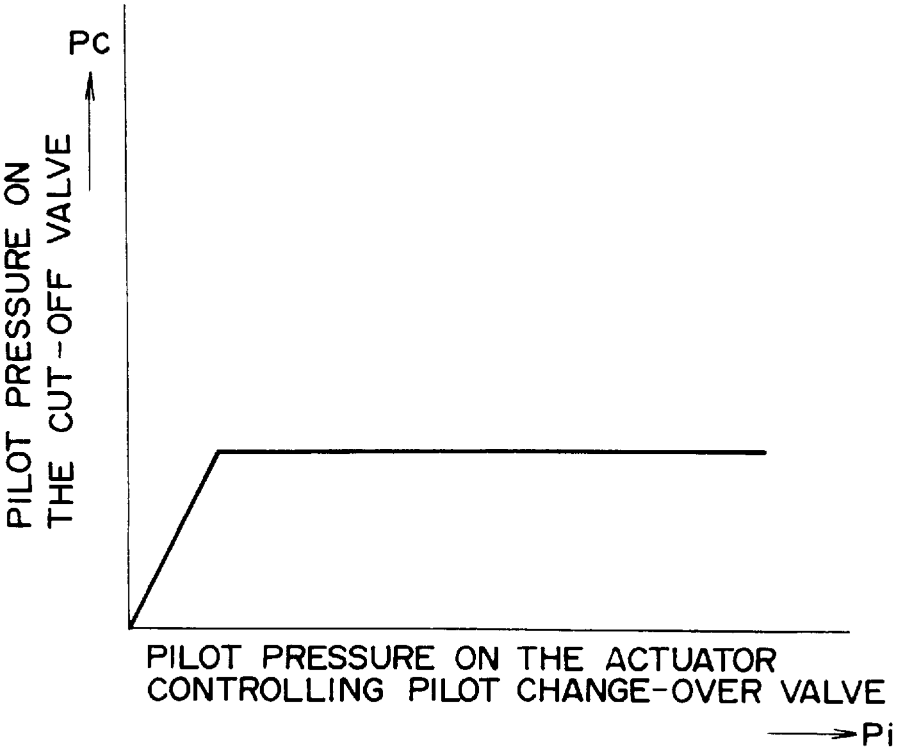
FIG. 5 is a graph showing a relation between a pilot pressure on a pilot change-over valve for controlling an actuator and a pilot pressure on a cut-off valve according to a modification of the invention.

Another embodiment of the present invention will now be described. FIG. 5 is a graph showing a relation between a pilot pressure Pi acting on the pilot port of any of the pilot change-over valve 14 for boom, the pilot change-over valve 11 for arm and the pilot change-over valve 13 for bucket and a pilot pressure Pc for command acting on pilot ports 81L and 81R of the cut-off valves 17L and 17R. As shown in the same figure, if the pilot pressure Pc for command is set so as to increase abruptly in proportion to the pilot pressure Pi at an initial stage required, it is possible to make the start-up of actuators such as boom, arm and bucket more sensitive.

I claim:

1. A hydraulic control circuit in a hydraulic excavator, comprising:

a boom cylinder for actuating a boom;

a piloted change-over valve for boom, controlling operation of said boom cylinder;

a first center bypassing oil path extending through an neutral position of said piloted change-over valve for boom and providing communication between a first hydraulic pump and a hydraulic oil tank;

a cut-off valve disposed downstream of said piloted change-over valve for said boom in said first center bypassing oil path; and a first controller which outputs a command for closing said first cut-off valve and said first center bypassing oil path in a proportional relation to each other to enhance the responsivity of said boom cylinder.

2. A hydraulic control circuit in a hydraulic excavator according to claim 1, further comprising an operation characteristic selecting device connected to said first controller means and capable of adjusting an output of said controller means.

3. A hydraulic control circuit in a hydraulic excavator according to claim 2, wherein said operation characteristic selecting means can be adjusted by means of a volume control adapted to set an operation characteristic of at least the boom.

4. A hydraulic control circuit in a hydraulic excavator according to claim 2, wherein said operation characteristic selecting means is a work mode change-over switch capable of setting a plurality of work modes of the hydraulic excavator.

5. A hydraulic control circuit in a hydraulic excavator according to claim 1, wherein said first controller means increases a step-up gain of a regulator for the first hydraulic pump to enhance the responsivity of said boom cylinder.

6. A hydraulic control circuit in a hydraulic excavator according to claim 1, further comprising:

an arm cylinder for actuating an arm;

a piloted change-over valve for arm, controlling operation of said arm cylinder;

a second center bypassing oil path extending through a neutral position of said piloted change-over valve for arm and providing communication between a second hydraulic pump and a hydraulic oil tank; and a confluent valve for boom, joining the oil discharged from said first hydraulic pump and the oil discharged from said second hydraulic pump in accordance with the output of said first control means to enhance the responsivity of said boom cylinder.

7. A hydraulic control circuit in a hydraulic excavator according to claim 1, wherein said first controller means actuates said first cut-off valve and rapidly at an initial stage of operation of the boom.

8. A hydraulic control circuit in a hydraulic excavator, comprising:

an arm cylinder for actuating an arm;

a piloted change-over valve for arm, controlling operation of said arm cylinder;

a second center bypassing oil path extending through a neutral position of said piloted change-over valve for arm and providing communication between a second hydraulic pump and a hydraulic oil tank;

a second cut-off valve disposed downstream of said piloted change-over valve for arm in said second center bypassing oil path; and a second controller means which outputs a command for closing said second cut-off valve and said piloted change-over valve for arm in a proportional relation to each other to enhance the responsivity of said arm cylinder.

9. A hydraulic control circuit in a hydraulic excavator according to claim 8, wherein said second controller increases a step-up gain of a regulator for the second hydraulic pump to enhance the responsivity of said arm cylinder.

10. A hydraulic control circuit in a hydraulic excavator according to claim 8, further comprising:

a boom cylinder for actuating a boom;

a piloted change-over valve for boom, controlling operation of said boom cylinder;

a first center bypassing oil path extending through a neutral position of said piloted change-over valve for boom and providing communication between a first hydraulic pump and a hydraulic oil tank; and a confluent valve for arm, joining the oil discharged from said first hydraulic pump and the oil discharged from said second hydraulic pump in accordance with the output of said second control means to enhance the responsivity of said arm cylinder.

11. A hydraulic control circuit in a hydraulic excavator according to claim 8, wherein said second controller actuates said second cut-off valve and rapidly at an initial stage of operation of the arm.

* * * * *